United States Patent [19]
Puttock et al.

[11] 3,869,626
[45] Mar. 4, 1975

[54] DYNAMO ELECTRIC MACHINES

[75] Inventors: Michael Charles Puttock, Sunbury; Bryan Crosby Linfoot, Amersham, both of England

[73] Assignee: EMI Limited, Hayes, Middlesex, England

[22] Filed: Sept. 27, 1971

[21] Appl. No.: 184,120

[52] U.S. Cl. ................. 310/152, 310/156, 310/268
[51] Int. Cl. .......................................... H02k 21/12
[58] Field of Search ........... 310/155, 152, 154, 156, 310/46, 268, 168

[56] References Cited
UNITED STATES PATENTS
3,230,406   1/1966   Baudot.............................. 310/155
3,247,407   4/1966   Bruneel.......................... 310/168 X

*Primary Examiner*—Donovan F. Duggan
*Attorney, Agent, or Firm*—Fleit & Jacobson

[57] ABSTRACT

A dynamo electric machine is described in which windings arranged for carrying alternating current are associated with pole pieces which are constructed from a magnetically soft ferrite material. The pole pieces are, in one example, formed as part of a stator arrangement, and a co-operating rotor arrangement includes a permanently magnetized structure which is constructed from a magnetically hard ferrite material. Such machines are especially suitable for use as alternators or motors.

6 Claims, 6 Drawing Figures

DYNAMO ELECTRIC MACHINES

The present invention relates to electrical machines, such as dynamos, alternators and motors. In particular the invention relates to such dynamo electric machines having windings associated with pole pieces, and it is an object of the present invention to provide a construction of such an electrical machine which provides for greater efficiency.

According to the present invention there is provided a dynamo electric machine comprising a rotor member including an annulus of magnetically hard ferrite material with a plurality of magnetic domains arranged in a ring on one face thereof, adjacent domains being magnetised in different senses; and a stator member spaced from said rotor member and formed of magnetically soft material, said stator including a plurality of substantially cylindrical magnetically soft ferrite poles protruding therefrom arranged in a circle concentric with said annulus and having substantially circular faces directed towards said domains for establishing magnetic flux linkage therewith, each of said poles being encompassed by a plurality of closed loop windings of electrically conductive material.

Figure 1A:
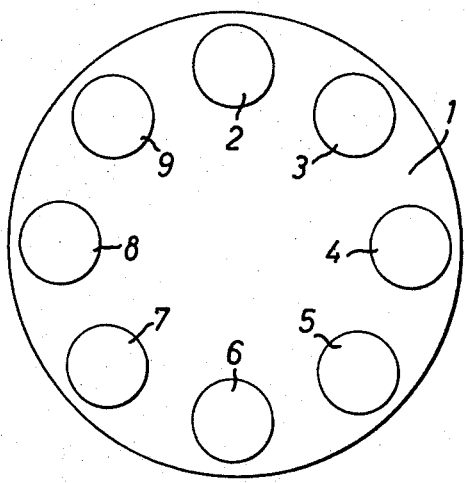
Figure 1B:
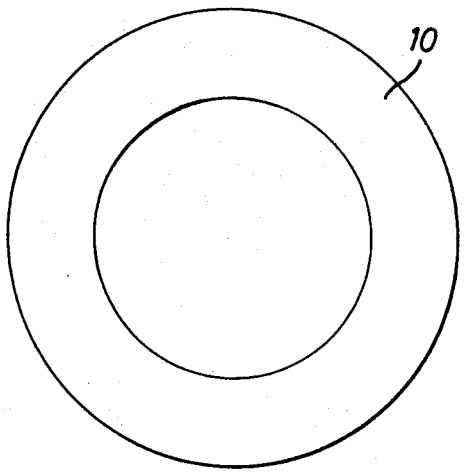
Figure 2:
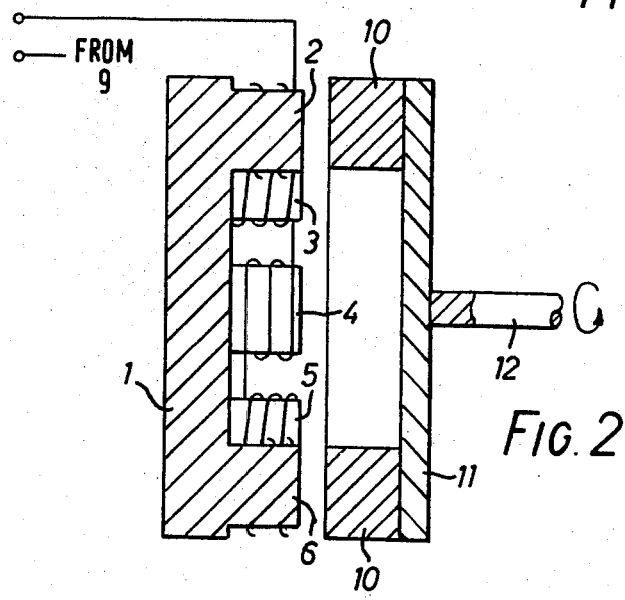
Figure 3:
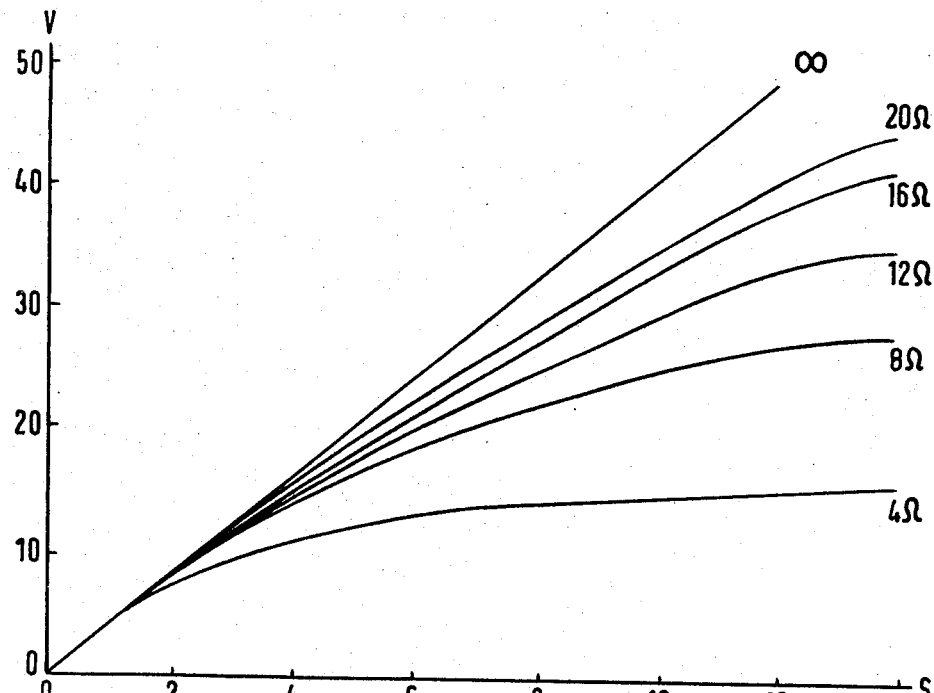
Figure 4:
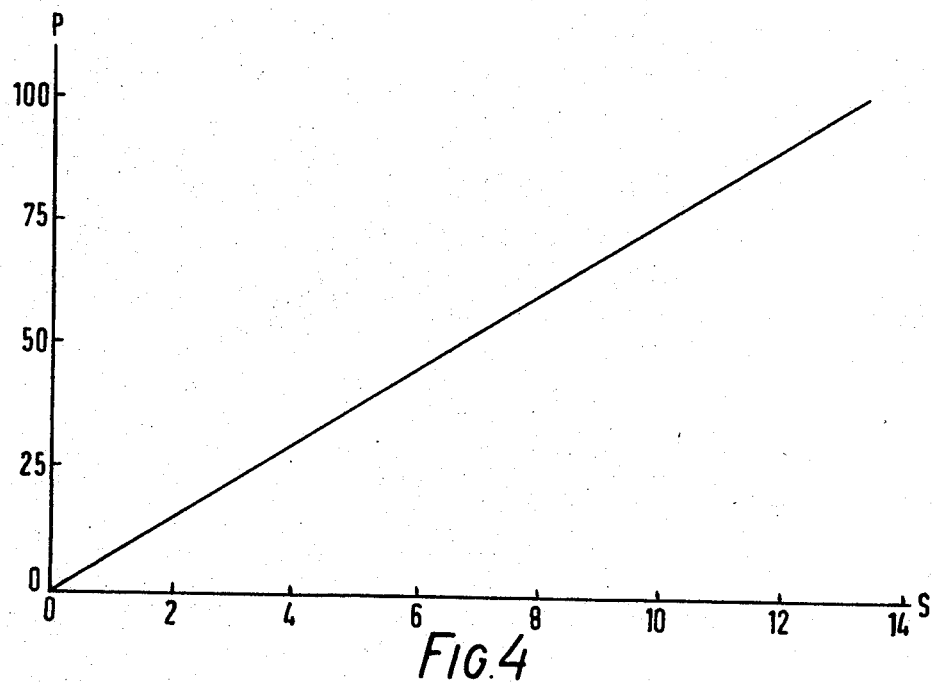
Figure 5:
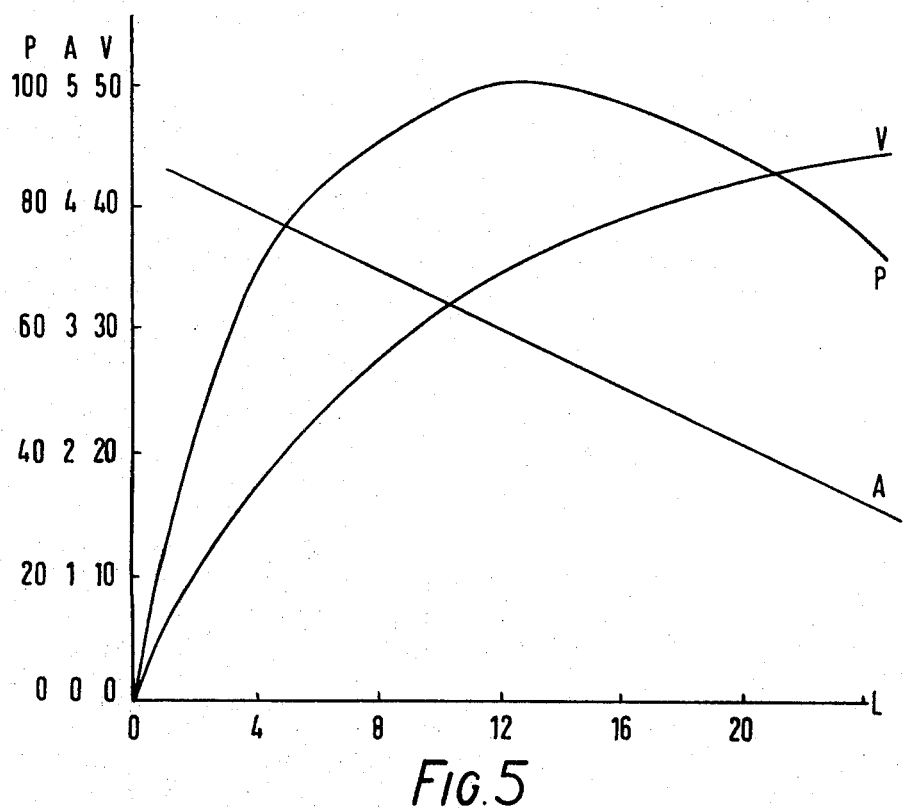

In order that the present invention may be fully understood and readily carried into effect, it will now be described with reference to the accompanying drawings, in which:

FIG. 1(a) is a plan view of the stator including the pole pieces for a dynamo electric machine according to one example of the present invention, FIG. 1(b) is a plan view of the rotor for the electrical machine, FIG. 2 is a cross-sectional view of the dynamo electric machine itself, and FIGS. 3, 4 and 5 are graphs illustrating the performance characteristics of the machine.

The example of a dynamo electric machine according to the present invention about to be described comprises an alternator, and referring first to FIG. 1(a), the stator comprises a disc 1 of magnetically soft ferrite material carrying eight cylindrical pillars 2 to 9, also of magnetically soft ferrite material, and which constitute the pole pieces. Each one of pole pieces 2 to 9 is 1.25 cm long and 9 mm diameter. The whole arrangement may be made by attachment of pole pieces 2 to 9 to disc 1, or by fabrication as a single unit for example by sintering.

Examples of magnetically soft ferrite materials are described in U.S. Pat. No. 2,452,530, comprising zinc ferrite having a low Curie point, combined with one or more cubic ferrites such as nickel ferrite of a higher Curie point. The products have high magnetic permeability and low magnetic losses, and have Curie points between 40° and 250°C. British Patent specification No. 701,364 describes further examples of magnetically soft ferrite materials based on those of U.S. Pat. No. 2,452,530.

The rotor comprises an annulus shown by reference 10 in FIG. 1(b), whose outside diameter is the same as the diameter of disc 1 of the stator, namely 5.1 cm, and is constructed from a magnetically hard ferrite material. Rotor 10 is magnetised so that eight domains are formed around the annulus, adjacent domains being magnetised in opposite directions with the poles being situated on the upper and lower faces of rotor 10. Examples of magnetically hard ferrite materials are described in British Patent specification No. 708,127.

A cross-sectional view of the alternator itself is shown in FIG. 2, from which it will be seen that rotor 10 is mounted facing pole pieces 2 to 9, and co-axially with disc 1 of the stator. Rotor 10 is mounted on a steel backing disc 11 and is rotated by means of a shaft 12 driven by the motive power desired to be converted into electrical power. Pole pieces 2 to 9 carry windings in the conventional manner, that is adjacent pole pieces have their windings in the opposite sense and in series. For greatest efficiency the gap between pole pieces 2 to 9 and rotor 10 must be as small as possible and in this example it was $3.05 \times 10^{-4}$ cm.

FIG. 3 is a graph showing a family of curves of the output voltage (V) against rotor speed (S) for different loads for the alternator constructed as described above. The ordinate (V) is calibrated in r.m.s. volts and the abscissa (S) is calibrated in thousands of revolutions per minute. It will be seen that as the load increases towards an open circuit, the linearity improves showing the alternator to be suitable for use as a tachogenerator.

FIG. 4 is a graph showing peak power (P) against speed (S). The ordinate (P) is calibrated in watts and the abscissa (S) in thousands of revolutions per minute. It will be seen that the response is linear, giving about 100 watts at about 14 thousand revolutions per minute, and clearly any limiting effect introduced by speed was not reached. The peak power available at any given speed with the above alternator is about ten times that available from a conventional alternator constructed using iron laminated pole pieces, due for example to the avoidance of iron losses and eddy current losses. It is anticipated that the peak powers available from the above alternator can be increased by increasing the diameters of the pole pieces 2 to 9 (and the annular width of rotor 10) so that more of the rotor 10 is covered at any given time.

FIG. 5 is a graph showing the performance of the alternator at a nominal speed of 12,500 revolutions per minute. Three curves are shown: the variation peak power (P) with load (L) the variation of output voltage (V) with load (L); and the variation of current (A) with load (L). The ordinate (P, A, and V) is calibrated in watts, r.m.s. current in amperes and r.m.s. volts respectively, and the abscissa (L) is calibrated in ohms.

Modifications may be made to the above described alternator. For example rotor 10 may be replaced by any other appropriate permanently magnetised structure, and the number and shape of pole pieces 2 to 9 may be altered. Moreover it will of course be appreciated that the invention may be applied to any dynamo electric machine having windings which carry alternating current and are associated with pole pieces, such as motors, and in fact the above described alternator can be operated as a motor by feeding alternating current to the windings on pole pieces 2 to 9. It has been found that machines according to the invention are considerably more efficient than conventional machines, which use for example iron laminated pole pieces, due to the use of pole pieces which are constructed from a magnetically soft ferrite material, leading to the avoidance of for example iron losses and eddy current losses.

What we claim is:

1. A dynamo electric machine comprising a rotor member including an annulus of magnetically hard ferrite material with a plurality of magnetic domains arranged in a ring on one face thereof, adjacent domains being magnetised in different senses; and a stator member spaced from said rotor member and formed of magnetically soft material, said stator including a plurality of substantially cylindrical magnetically soft ferrite poles protruding therefrom arranged in a circle concentric with said annulus and having substantially circular faces directed towards said domains for establishing magnetic flux linkage therewith, each of said poles being encompassed by a plurality of closed loop windings of electrically conductive material.

2. A dynamo electric machine according to claim 1 arranged as an alternator.

3. A dynamo electric machine according to claim 1 arranged as a motor.

4. A dynamo electric machine according to claim 1 including eight pole pieces arranged in a ring on said stator, and eight magnetic domains formed on said rotor.

5. A dynamo electric machine according to claim 1 wherein said rotor and stator member respectively comprise a circular disc of magnetically hard ferrite and a circular disc of magnetically soft ferrite with the common axis of symmetry thereof forming the rotation axis of said rotor.

6. A dynamo electric machine according to claim 1 wherein said poles and said domains have substantially equal face areas for establishing magnetic flux linkage therebetween.

* * * * *